United States Patent
Lee et al.

(10) Patent No.: US 6,708,167 B2
(45) Date of Patent: Mar. 16, 2004

(54) METHOD FOR SEARCHING MULTIMEDIA DATA USING COLOR HISTOGRAM

(75) Inventors: Jin Soo Lee, Seoul (KR); Hyeon Jun Kim, Kyounngi-do (KR); Ji Eun Lee, Seoul (KR)

(73) Assignee: LG Electronics, Inc., Seoul (KR)

( * ) Notice: Subject to any disclaimer, the term of this patent is extended or adjusted under 35 U.S.C. 154(b) by 456 days.

(21) Appl. No.: 09/725,037

(22) Filed: Nov. 29, 2000

(65) Prior Publication Data

US 2001/0002132 A1 May 31, 2001

(30) Foreign Application Priority Data

Nov. 29, 1999 (KR) .......................................... 1999-53587
Nov. 29, 1999 (KR) .......................................... 1999-53588

(51) Int. Cl.$^7$ .............................................. G06F 17/30
(52) U.S. Cl. ....................................................... 707/6
(58) Field of Search ............................................ 707/6

(56) References Cited

U.S. PATENT DOCUMENTS 6,285,995 B1 * 9/2001 Abdel-Mottaleb et al. ..... 707/3
6,526,167 B1 * 2/2003 Numaoka .................... 382/157

OTHER PUBLICATIONS

Pack et al. "Image indexing using weighted color histogram" International Conference on Image Analysis and Processing 1999 Procedings, Sep. 1999, IEEE, pp. 909–914.*

Yamamoto, et al. "Content–based similarity retrieval of images based on spatial color distributions" 1999 procedings Internation Conference on Image Analysis, Sep. 1999, pp. 951–956.*

* cited by examiner

*Primary Examiner*—Jack M Choules
(74) *Attorney, Agent, or Firm*—Fleshner & Kim LLP

(57) ABSTRACT

The present invention relates to a multimedia search method for searching multimedia objects using color histogram.

The present invention provide a multimedia retrieval method and a multimedia feature structure capable of accelerating accurate and efficient multimedia object search by adopting various meaning reflection level according to each bin value of the color histogram.

In the present invention, the color groups are classified into the solid, neutral, and gray levels, and the binarization standard point is determined at each color group such that the color distribution can be effectively represented in the binary histogram, resulting in improving the retrieval performance of binary color histogram which is a shortcoming in the conventional binary histograms in addition to remaining the high efficiency of the binary color histogram.

30 Claims, 14 Drawing Sheets

*Original Histogram*

*High Filtered Histogram*

METHOD FOR SEARCHING MULTIMEDIA DATA USING COLOR HISTOGRAM

BACKGROUND OF THE INVENTION (a) Field of the Invention

The present invention relates to a multimedia search method for searching multimedia objects using color histogram, and in particular, to a multimedia search method capable of accelerating accurate and efficient multimedia object search using improved multimedia features extraction, and multimedia feature data structure therefor.

(b) Description of the Related Art

Recently, content-based multimedia search technologies were reported and various search engines are developed in image search field.

Well known are methods for searching images using entire color histogram, local color information, and texture information. Especially, the color- and texture-information weighted image retrieval technologies are reported.

Most of these conventional technologies use various information such as color and texture for content-based retrieval, particularly a color histogram as the most important information.

A color histogram is a representation of a random distribution of colors and the number of bins that are comprised in the histogram depends on a color quantization level.

A value of the bin is represented by a floating-point number and similarity of two images is determined by a distance between the two histograms of the images. Thus, the floating-point number calculation requires a much memory space over the net value of the bin.

Although the distance computation is not difficult and guarantee that relatively similar images are identified, this may require an enormous amount of time and computing resources for repeatedly comparing lots of image features when browsing lots of images.

Also, the color histogram is considered just as a color distribution of an image such that it is difficult to expect a considerable search performance in itself.

While image retrievals are performed using the same color histogram, the result can differ from each other according to similarity measurements and each bin of the color histogram can have a little difference such that an improved retrieval technology can be conceived by using these characteristics.

SUMMARY OF THE INVENTION

The present invention has been made in an effort to solve the above problems of the prior art.

It is an object of the present invention to provide a multimedia retrieval method and a multimedia feature structure capable of accelerating accurate and efficient multimedia object search by adopting various meaning reflection level according to each bin value of the color histogram.

To achieve the above object, in the present invention, the color groups are classified into the solid, neutral, and gray levels, and the binarization standard point is determined at each color group such that the color distribution can be effectively represented in the binary histogram, resulting in improving the retrieval performance of binary color histogram which is a shortcoming in the conventional binary histograms in addition to remaining the high efficiency of the binary color histogram.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will be described hereinafter with reference to the accompanying drawings.

A multimedia search based on a histogram is used for retrieving an image, a frame in a video stream, or a video clip. Most of the multimedia objects are similar to each other such that the image search is exemplary explained.

Typically, an image search using color histogram is performed by comparing a histogram of a target object to a histogram of a reference object. The difference between the target and the reference histograms are determined by the sum of the distances of every corresponding bin values between the two histograms regardless to a distance between each corresponding bin values of the histograms.

However, the color histogram of each image shows the following phenomena.

1. In an image, not exist all but some colors exist, such that there exist many bins having a value of 0 and a existence rate of 0 bin is proportional to the color quantization level.

Figure 1:
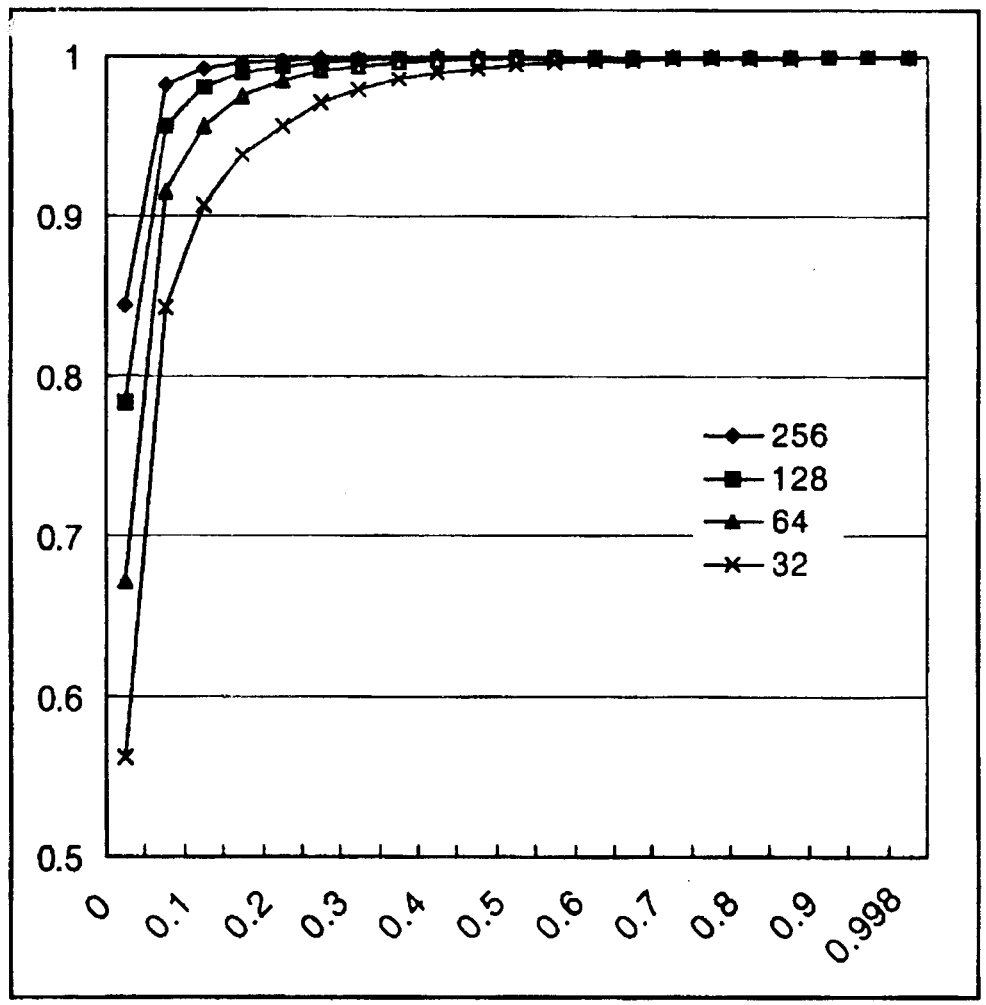
FIG. 1 is a graph for illustrating cumulative random distribution of bin values.

FIG. 1 shows this image feature. As shown in FIG. 1, the graphs shows the percentage of the accumulation of the existence rate occupying the histogram at respective quantization level, as an average bin value size gets larger. Although a bin value range is between 0 and 1, a little increase from 0 of the bin value make most of the bin values are less than or equal to the value. Particularly, the finer the quantization level, the higher the occupancy rate of the 0 bins gets.

Figure 2:
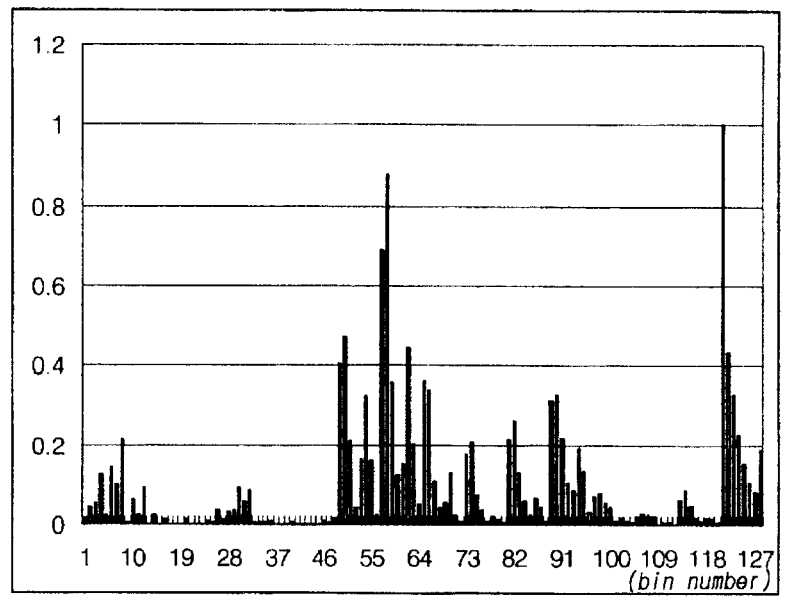
FIG. 2 is a 128 level average color histogram example for explaining the present invention.

2. Among the bins of the color histogram, a color can be frequently found in most images. For example, black is a color dominantly found most of natural images regardless to image types. FIG. 2 is a histogram of a natural image exemplary showing this feature. As shown in FIG. 2, the relatively taller columns in the histogram are bins of gray scale(120–127) and particularly the black is the most dominant.

On the basis of the above phenomena, each bin value can be characterized as follows.

Feature 1: Existing a bin having a 0 value in one image, but having a value of non-zero in another image means that there is a color which can exist in one image but not in another image such that this kind of color is important to distinguish the images. That is, it means existence information in addition to the value of a bin. (Similarity of color factor existence)

Feature 2: If two images have bins of non-zero values, this means the color exists in both the two images and only the distributions of that color differ from each other.

Feature 3: If a bin value is greater than a predetermined value, the difference of the two value means the value is not important as much as a value less than the predetermined value. Accordingly, it is needed to compensate for a histogram distance caused by that great value. (Method for deleting anti-similarity caused by a extremely concentrated color)

By considering the above features of the bin value, more accurate search can be expected.

The above feature 1 can be reflected through a binary histogram binarized on a basis of 0. The binary histogram can be transformed as follow using a conventional histogram.

Binary histogram[1]=If (histogram[1]===0), then 0. otherwise 1.

The distance (Dist_Exist) between two images using binary histogram is calculated by the exclusive OR (XOR) operation of the two binary histograms as follow.

Dist_Exist=number of '1' after the XOR operation between the reference and target binary histograms Accordingly, when calculating the distance (New_Dist) reflecting the feature 1, the equation can be combined with the previous distance equation (Dist) as follow.

$$New\_Dist=\beta \cdot Dist\_Exist+Dist$$

β: reflection coefficient

The feature 3 can be reflected using a high-filtered histogram on the basis of a predetermined threshold value (T_U).

Figure 3:
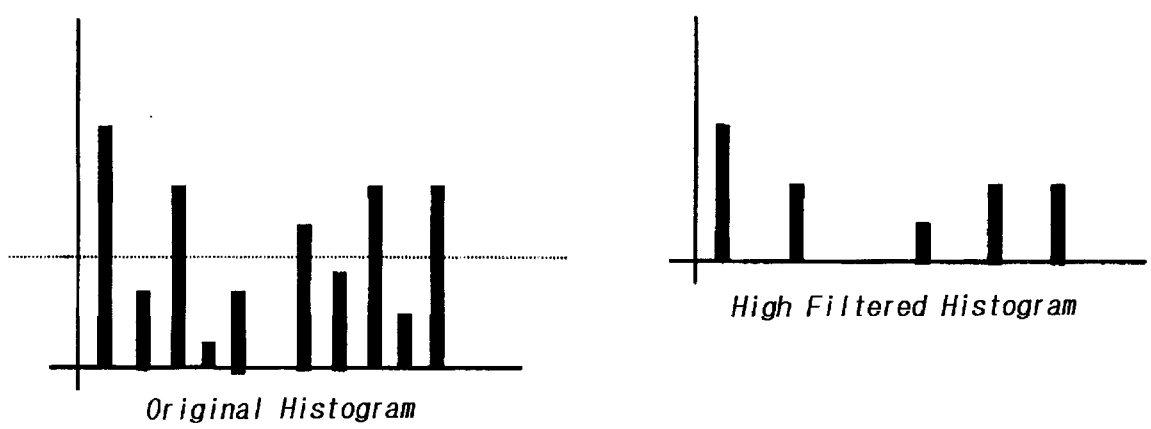
FIG. 3 is a graph for explaining color-filtering effect according to the present invention.

The high-filtered histogram is a histogram filtered in by a predetermined threshold value for reflecting the high values. (see FIG. 3)

As subtracting the high-filtered histogram difference (Dist_H) from the original distance value, if the bin value is greater than the threshold value (T_U), the difference of the value do not influence to the similarity:

$$New\_Dist=Dist-Dist\_H$$

When the feature 2 is regarded as an original histogram difference, a new distance value can be obtained in consideration of the features 1 and 3 as follow.

$$New\_Dist=\beta \cdot Dist\_Exist+Dist-Dist\_H$$

Figure 4:
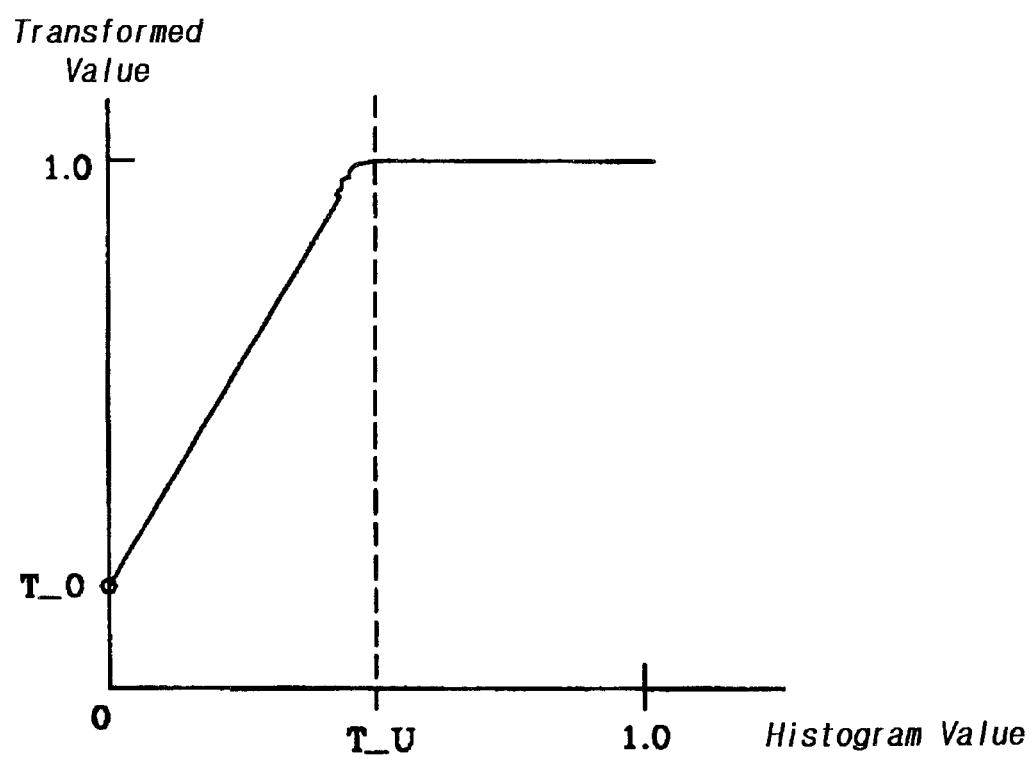
FIG. 4 is a graph for explaining a mapping of histogram values to a transformed function.

FIG. 4 is a graph showing a transformation of color bin value by reflecting the above features.

In FIG. 4, supposing the X-axis refers to the bin values of the original color a Y-axis refers to the transformed bin value, the expansion between 0 and a value above 0 as much as T_O is a result of reflecting the feature 1, and the transformation of the values greater than T_U to a predetermined value is a result of reflecting the feature 3.

The above explained similarity equation can be modified as follow. (another preferred embodiment for multimedia search using conversion histogram)

New_Dist is a sum of absolute values of differences between transformed reference and target histograms.

When MAX is a maximum value that a bin can take in the transformed histogram, each bin value of color histogram is transformed to:

(a) 0, if the transformed histogram bin value is 0, (b) transformed histogram bin value=histogram bin value×(MAX−T_O)×(MAX/T_U)+T_O, if the transformed histogram value is less than the threshold (T_U) and the condition of (a) is not satisfied, (c) transformed histogram bin value=MAX, if the conditions of (a) and (b) are not satisfied.

There are three methods to reflect the above features 1, 2, and 3.

We define the above equations (a),(b),(c) as 'histogram transform equation'.

The first method is to use a general histogram with a similarity measurement in consideration of the above features.

The second method is to create a histogram reflected the above features.

The third method is to use a similarity measurement capable of reflecting the above features with the original histogram.

Now, the first method to reflect the features 1, 2, and 3 will be described.

A new distance measurement equation adopted the above features is as follow.

$$New\_Dist=\beta oexist+dist-dist\_H'$$

Supposed "dist" is a distance measurement equation using the general histogram (i.e., the sum of distance between the reference and the target color histograms), "exist" reflects the feature 1.

That is, since a bin of which value is 0 in one image and non-zero in another image means, it contains the color existence information, this information is additionally imposed to the similarity measurement.

The "exist" is the number of bins of that value is 0 in one of the reference and target histograms and non-zero in the other such that it is the same with the result obtained by exclusive OR operation after binarization of the two histograms into 0 and non-zero bits.

Also, the coefficient β is considered such that if the β is 0, the difference between the original color histogram and the high-filtered histogram are used. (only the feature 3 is reflected)

While, the "dist_H" is a high-filtered histogram filtered in values above the threshold value (Th) such that the values less than the threshold value are transformed into 0 and the values greater than the threshold value are subtracted by the threshold value. (see FIG. 3)

By subtracting the "dist_H" from the original histogram, the influence caused by the difference from the bin values above the predetermined value is decreased, which means to reflect only the feature 3.

In case when the threshold value for filtering the original histogram is equal to the maximum value of the histogram, all the dist_H is to be 0 such that only the binarized histogram is used, resulting in reflecting feature 1.

The above equation provide a similarity measurement method for more efficient multimedia search using all the original histogram, binary histogram, and high-filtered histogram.

The binary and the high-filtered histograms can be obtained from the original histogram or can be previously set in advance such that these histograms are used in the first and the third methods for reflecting the features of the bin values.

Now, the second preferred embodiment of the present invention will be described.

The following is another method using only the original histogram. That is, New_dist is sum of absolute value of the distance between the transformed histograms of the original reference and target histograms.

New_Dist is sum of absolute values of differences between transformed reference and target histograms.

When MAX is a maximum value that a bin can take in the transformed histogram, each bin value of color histogram is transformed to:

(a) 0, if the transformed histogram bin value is 0,
(b) transformed histogram bin value=histogram bin value×(MAX-$T_{13}$ O)×(MAX/T_U)+T_O, if the transformed histogram value is less thin the threshold (T_U) and the condition of (a) is not satisfied,
(c) transformed histogram bin value=MAX, if the conditions of (a) and (b) are not satisfied.

That is, the original histogram value is changed into a transformed value for searching the multimedia objects and so as to obtain the original histogram difference using the transformed value such that the feature of New_dist= βoexist+dist−dist_H' can be reflected.

The value, T_O, is used to determine the similarity reflection level to the color existence information and the value, T_U, has the same value of the predetermined threshold value used for obtain H'.

By storing the transformed value in place of the original histogram value, only the difference between histograms of the reference and target objects is needed. This method is identical to the second method, i.e., the histogram creation method reflected the features.

In this case, each image contains the transformed histogram as a new feature.

All the above described three methods highly enhance the search performance by reflecting the above explained histogram features.

The value of the β and T_0 tend to increase as the number of the bins of the color histogram or the quantization level increase, because the number of 0 bins increase in proportional to the quantization level of the color in relation to the phenomenon 1.

The value β is fixedly used after the equation, New_dist= β·exist+dist−dist_H', is determined In the above explained methods, however, the value β can be vary in accordance with the color histogram features of corresponding images as follow.

new_β=[a]/[number of "1" after the exclusive or (XOR) operation between the reference and target histograms]
condition: "a" is a constant.

Until now, the improved multimedia search methods reflecting the features of the basic color histogram are explained.

Now, the above three multimedia search methods will be explained in detail with reference to the accompanying drawings.

Firstly, in the method using the similarity in consideration of the above features with the generally given color histogram, the original color histogram information maintaining the color distribution can be used as it was such that the extraction time is short. However, since the similarity measurement method requiring the consideration of the above features, relatively long time is required for searching an object.

FIG. 5~FIG. 8 show the steps of the image search according to this method.

Figure 5:
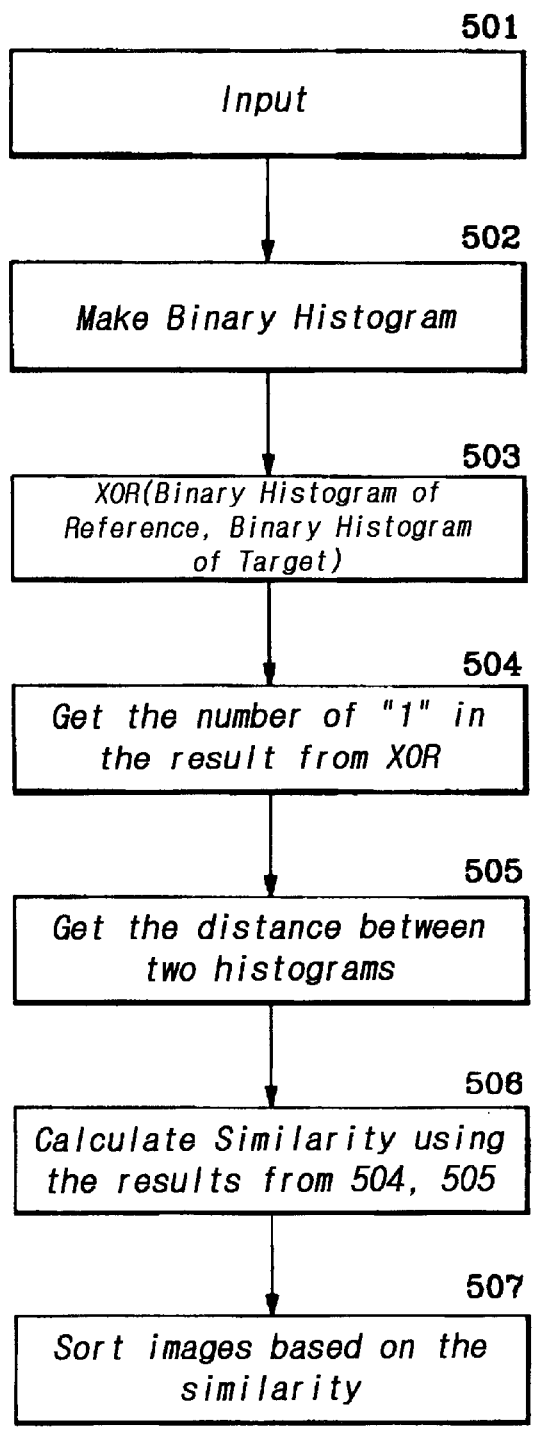
FIG. 5 is a flowchart for explaining a multimedia search method according to a first preferred embodiment of the present invention.

FIG. 5 illustrates the method reflecting the features 1 and 2.

Once color histogram information is input in step 501, a binary histogram is obtained using the previous color histogram in step 502, and then the two binary histograms of the target and reference objects are in the exclusive-OR operation in step 503.

As a result of the operation in step 503, the number of "1" is obtained in step 504, such that a distance between the two histograms in step 505.

Consequently, a final similarity between the two histograms using the result of the steps 504 and 505 in step 506. Finally, the images are arranged and stored in accordance with the similarities in step 507.

Figure 6:
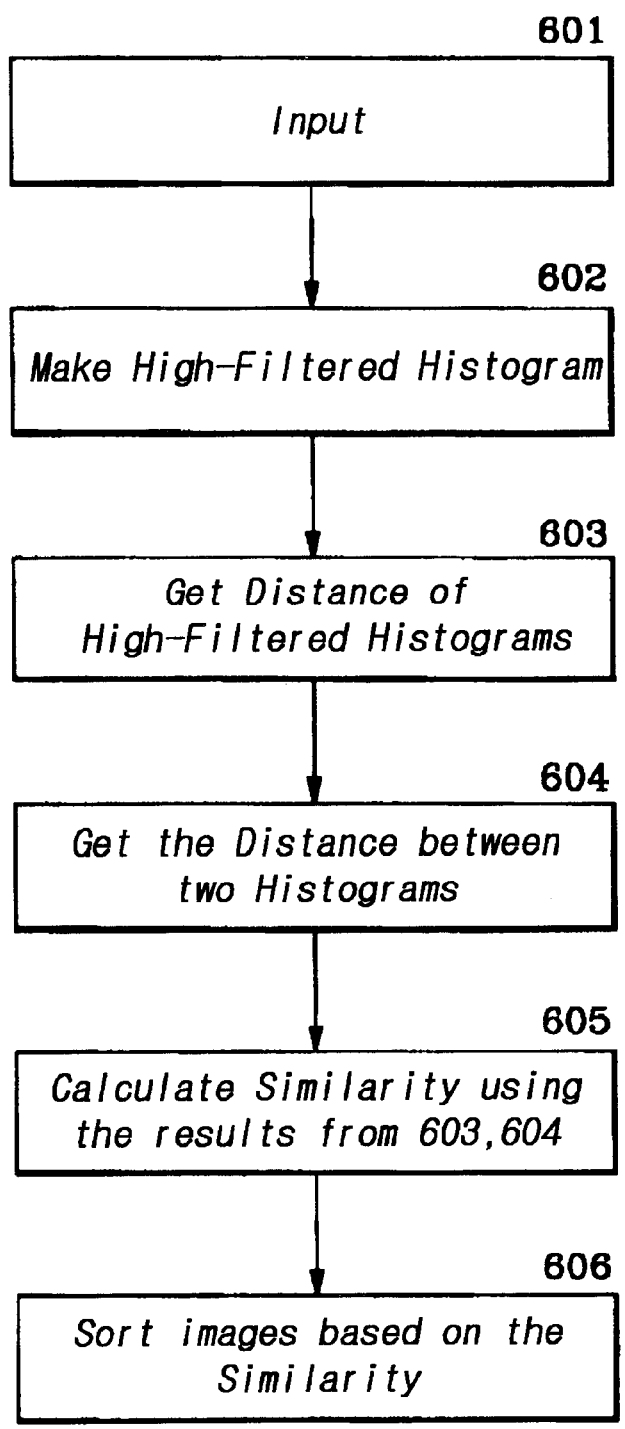
FIG. 6 is a flowchart for explaining a multimedia search method according to a second preferred embodiment of the present invention.

FIG. 6 illustrates the method reflecting only the features 1 and 3.

Once color histogram information is input in step 601, a high-filtered histogram is obtained using the previous color histogram in step 602, and then a distance between the two high-filtered histograms in step 603. Next, a distance between the two previous histograms of the target and reference objects in step 604.

Consequently, a final similarity between the two histograms using the results of the steps 603 and 504 in step 605. Finally, the images are arranged and stored in accordance with the similarities in step 606.

Figure 7:
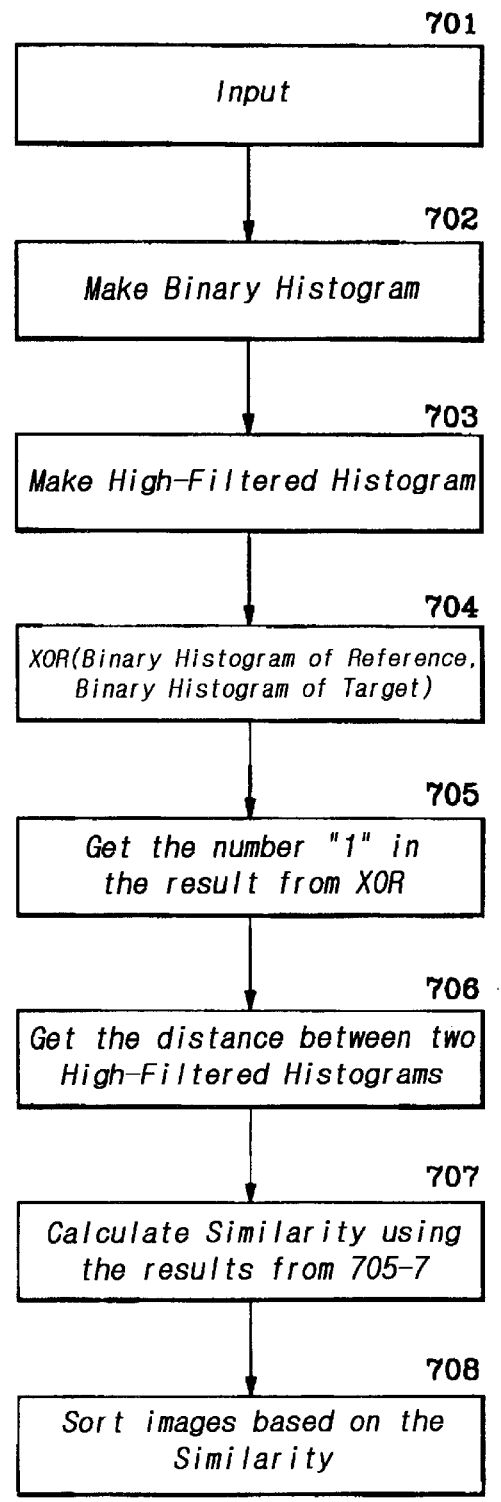
FIG. 7 is a flowchart for explaining a multimedia search method according to a third preferred embodiment of the present invention.

FIG. 7 illustrates the method reflecting all the features 1, 2 and 3.

Once color histogram information is input in step 701, a binary histogram is obtained using the previous color histogram in step 702, and then a high-filtered histogram is obtained using the previous color histogram in step 703.

Next, the two binary histograms of the target and reference objects are in the exclusive-OR operation in step 704. As a result of the operation in step 704, the number of "1" is obtained in step 705.

Consequently, a distance between the two high-filtered histograms of the target and reference objects in step 706, and then a distance between the two original histograms of the target and reference objects in step 707.

Finally, a final similarity between the two histograms using the results of the steps 705, 706, and 707 and then the images are arranged and stored in accordance with the similarities in step 708.

Figure 8:
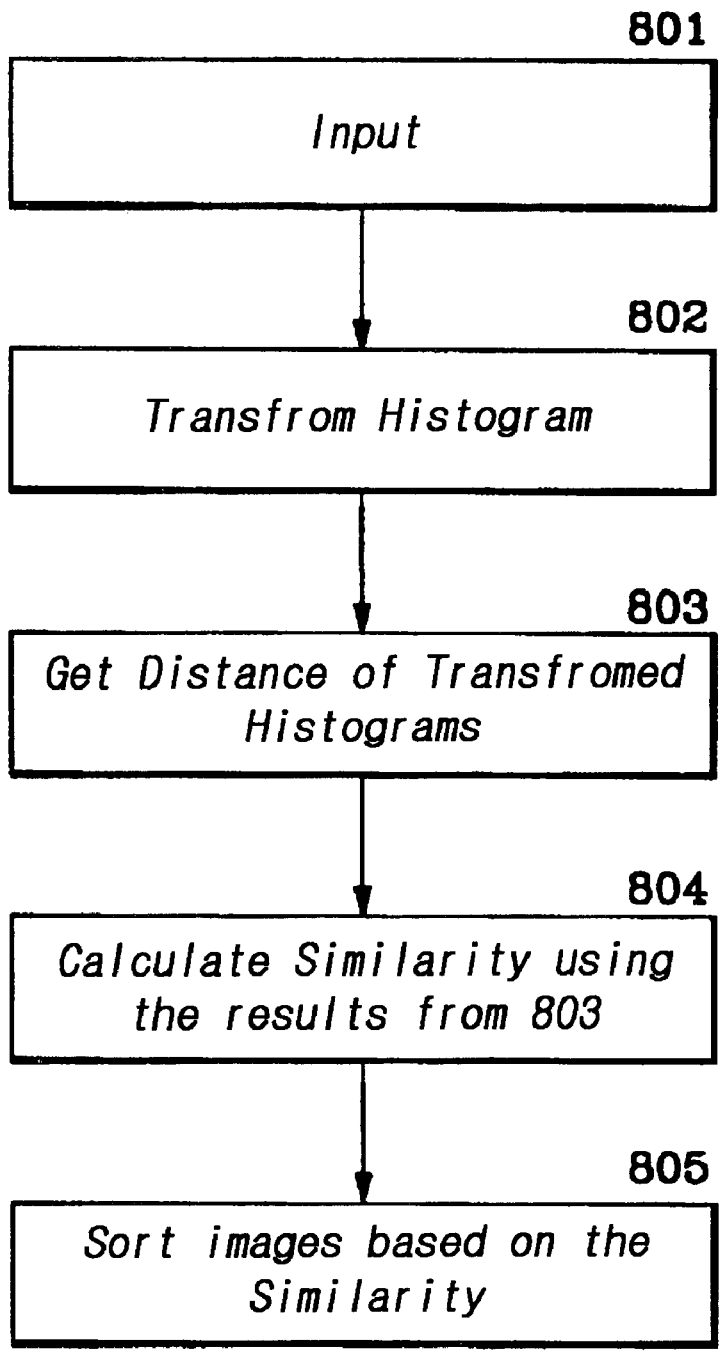
FIG. 8 is a flowchart for explaining a multimedia search method according to a fourth preferred embodiment of the present invention.

FIG. 8 illustrates the method obtaining the similarity after transformed a histogram value through the histogram transform equation (New_dist=the sum of distance between the reference and the target transformed histograms) without using the binary and high-filtered histogram but reflecting the features 1, 2, and 3.

Once color histogram information is input in step 801, all the bins are transformed through the histogram transform equation in step 802, and then obtains a distance between the transformed histograms of the target and reference objects in step 803.

Consequently, a final similarity between the two histograms using the result of the step 803 in step 804. Finally, the images are arranged and stored in accordance with the similarities in step 805.

The second method which firstly creates a histogram reflecting the features 1 and 3 guarantees a quick search time like the conventional method. However, since the color histogram is transformed, it is difficult to maintain the original color distribution information.

Figure 9:
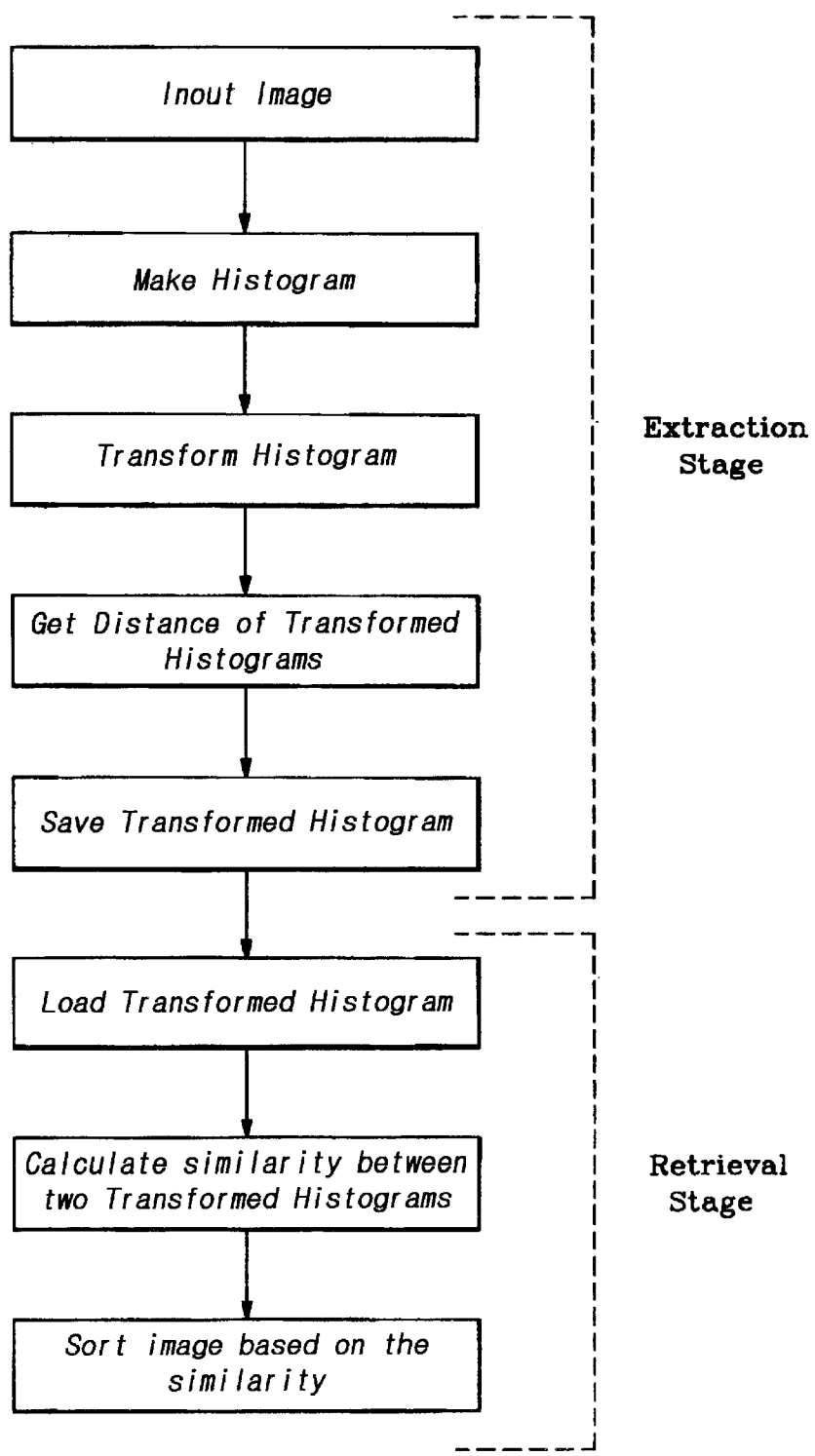
FIG. 9 is a flowchart for explaining a multimedia search method according to a fifth preferred embodiment of the present invention.

FIG. 9 shows one example of this kind of method.

This method consists of features extraction and retrieval stages. The features extraction stage comprises the steps of transforming each bin value of a histogram through the histogram transform and the target transformed histograms) and storing the histogram, and the retrieval stage comprises only measuring the similarity and arrange the images.

That is, once a histogram is obtained from the input information, the histogram is transformed as a transformed histogram and then the transformed histogram is stored and used to calculate a similarity between the reference and target transformed histograms and arrange the images in retrieval stage.

The third method reflecting the features 1 and 3 uses the information for the similarity measurement capable of reflecting the features and the original histogram.

To provide the same effect with the first method, the multimedia search method of the present invention use the original histogram, the binary histogram, and the high-filtered histogram filtered in above the threshold value such that all the three histograms are extracted and stored as the features.

That is, all the binary histogram, the high-filtered histogram, and the original histogram are extracted and stored as multimedia object information.

Figure 10:
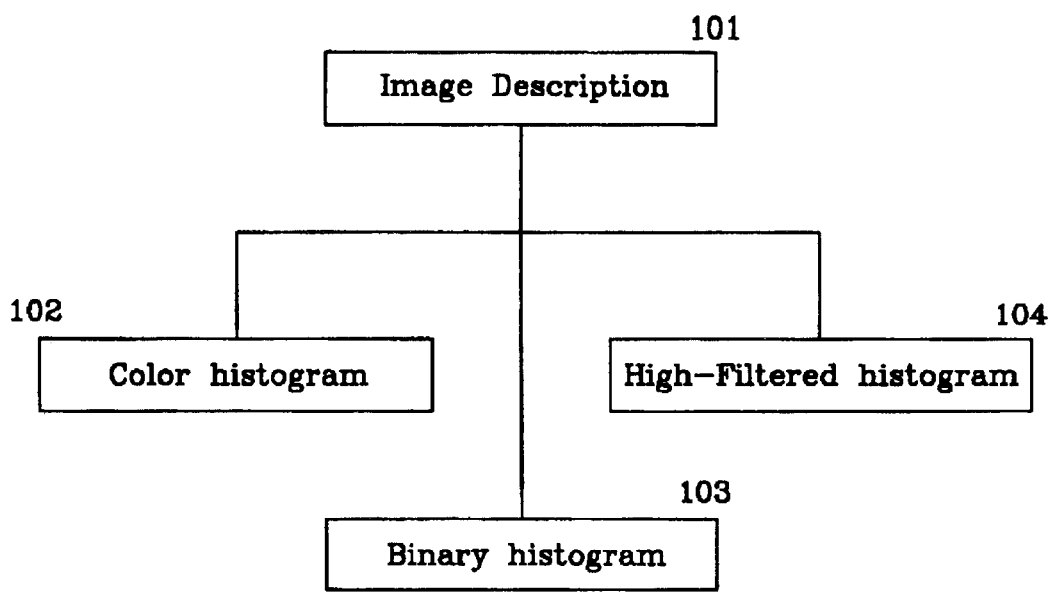
FIG. 10 is a block diagram showing a structure of image feature information according to the present invention.

FIG. 10 shows the multimedia object information structure. An image description 101 contains the color histogram 102, the binary histogram 103, and the high-filtered histogram 104.

This method guarantees quick search time, but should store all the 3 histogram information such that one of the three methods can be selected.

FIG. 11~FIG. 18 illustrations for explaining the multimedia search method of the present invention capable of reducing the storage and maintaining quick search time by classifying binary color information and using the classified binary color histogram.

Generally, when color feature of an image is represented in color histogram where the color is distributed in values between 0 and 1, a value of each bin is a very small.

Thus, when a bin is represented in a floating point number, there is a large portion where is not represented such that it is possible to represent the bin as more small space than the space capable of being represented in the floating point number. Even though this method can help reducing the storage space for feature information, much time is required to compare the histograms in the searching stage.

Supposed that an image is extremely represented with a binary histogram divided into 2 numbers, the distance calculation can be performed quickly and the information storage space can be reduced as many as the number of bits (bins).

Thus, if the color histogram can be represented by the binary histogram, it provides many advantages in the view of storage space and time.

However, the binarization of the color histogram causes its much information loss to deteriorate the search performance.

In the present invention, the binary histogram is formed as a binary color histogram by classifying the color into groups using different binarization standard so as to represent color feature as much as possible such that the binary color histogram is not degraded in comparison with the conventional color histogram and maintains the quick search time of the binary histogram.

According to a sample color distribution analysis, the color distribution feature can be classified into solid, neutral, and gray level groups.

Among them, the neutral color occupies the dominent area in normal images such that the neutral color is important to determine the retrieval performance in the image search. Accordingly, it is preferred to determine a standard point in the neutral color level in binarization.

Since the solid level color feature tends to lopsidedly appear in specific images not evenly all the images in general, a binarization standard point of the solid color is taken at a lower portion.

While, the gray color tends to evenly and frequently appear in all the images so as not to give meanings in the view of discrimination such that its binarization standard point is taken at a lower portion. Sometimes, the gray color is used in exceptional image retrieval.

The standard value of the neutral color binarization decreases, as the color quantization level, i.e., the number of the bins of the color histogram increase, because the finer the quantization levels, the smaller the value of each bin is.

In the present invention, the color groups are classified into the solid, neutral, and gray levels, and the binarization standard point is determined at each color group such that the color distribution can be effectively represented in the binary histogram, resulting in improving the retrieval performance of binary color histogram which is a shortcoming in the conventional binary histograms in addition to remaining the high efficiency of the binary color histogram.

As described above, the color histogram is a representation of a random distribution of color having a value in the discretized range between 0 and 1. Thus, the value of each bin is represented in that range. For example, FIG. 11 and FIG. 12 show the cumulative random distribution of bin value in respective 256 level and 128 level color quantizations.

Figure 11:
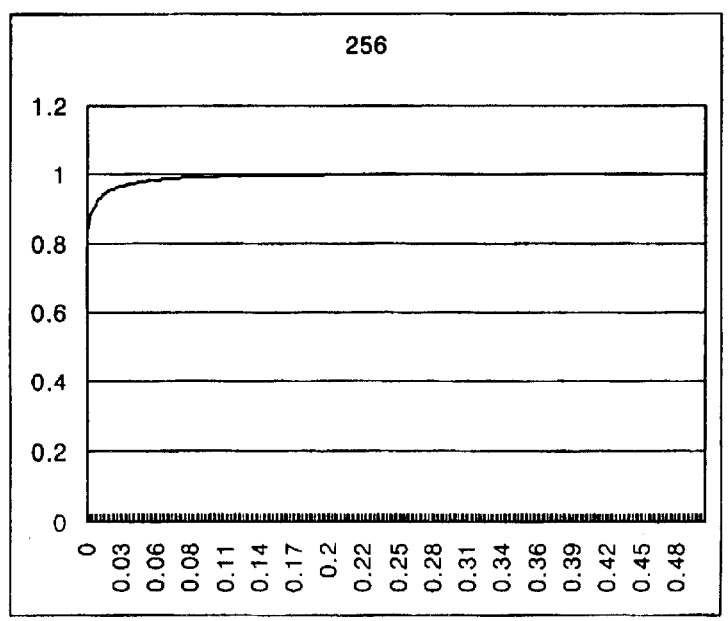
FIG. 11 is a graph showing a probability cumulative distribution of 256 level bin values.
Figure 12:
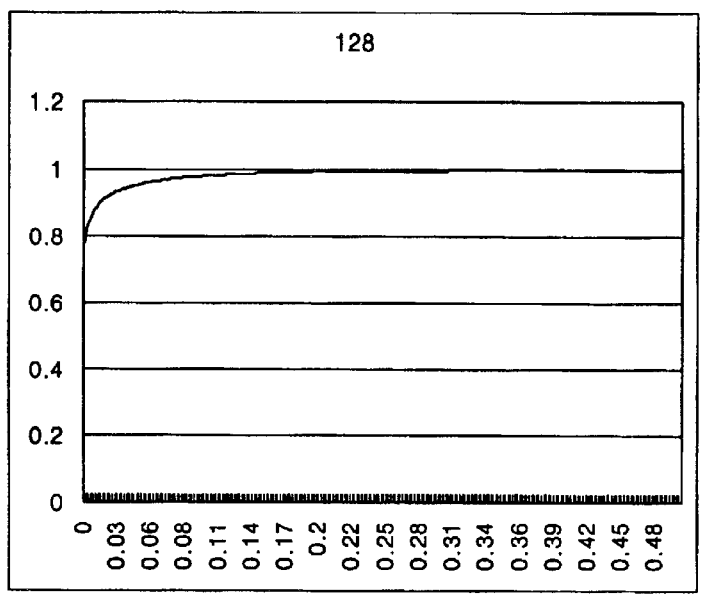
FIG. 12 is a graph showing a probability cumulative distribution of 128 level bin values.

As shown in FIG. 11 and FIG. 12, most of the bins show low probability values, and actually the bins over 95% have smaller than the value of 0.1.

Generally, the bin value is represented as a floating-point number in the range between 0 and 1 and the portion above 0.1 does not influence the image retrieval because of the above characteristic.

By using these distributional characteristics of the bin values, appropriate standard values of the histogram for binarization.

Figure 13:
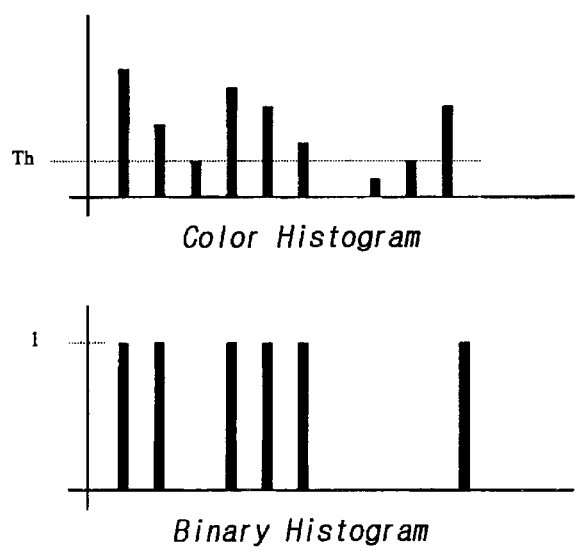
FIG. 13 shows a color and a binary histogram for explaining the present invention.

FIG. 13 is a view for explaining the binarization using a threshold value. As shown in FIG. 13, the color histogram is binarized by mapping the values greater than the threshold value (Th) to 1 and the values less than the threshold value (Th) to 0.

This transformed binary histogram has advantages in the storage space and the retrieval time to the conventional color histogram, which will be explained hereinafter.

Regarding the storage space, each bin of the conventional color histogram is represented with 4-byte float point number such that if the number of the bins of an image is N, 4N bytes is required to store the whole image. While, each bin of the binary histogram is represented only with 1 bit, the storage space required for storing N bins is N bits such that the binary histogram has 32 times higher degree of efficiency than that of the conventional color histogram.

Regarding the retrieval time, when using the Euclidean distance measurement (sum of the squares of distances between the reference and target histograms) which is frequently used in search time computation, N times of floating point number subtractions and N times of floating point number multiplications. While the binary histogram requires only N times of exclusive OR operations such that the retrieval time is short beyond comparison.

Figure 14:
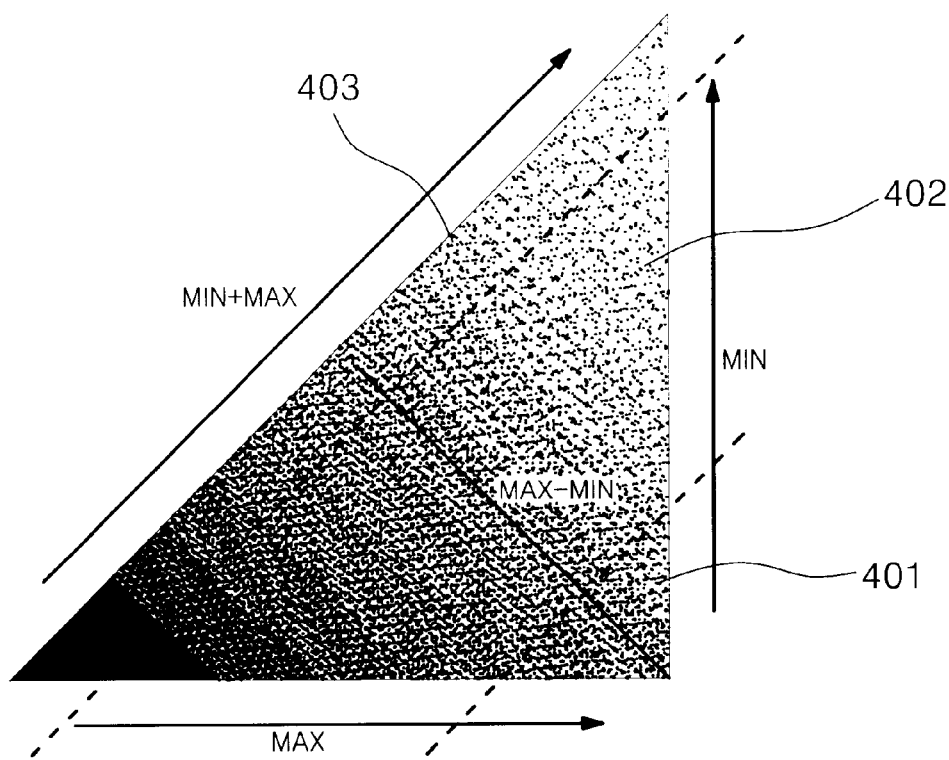
FIG. 14 is view showing a MMD section of HMMD color space for explaining the present invention.

FIG. 14 shows the three color groups using a Min_Max_Diff section of the color space (HMMD) represented by the features of hue, Min(R,G,B), Max(R,G,B), and Diff (Max-Min).

The reference numeral 401 in the FIG. 14 indicates the solid color portion where the Diff is greater than a predetermined threshold value, the reference numeral 402 indicates the neutral color portion, and the reference numeral 403 indicates the gray color portion where the Diff is less than the predetermined threshold value.

Figure 15:
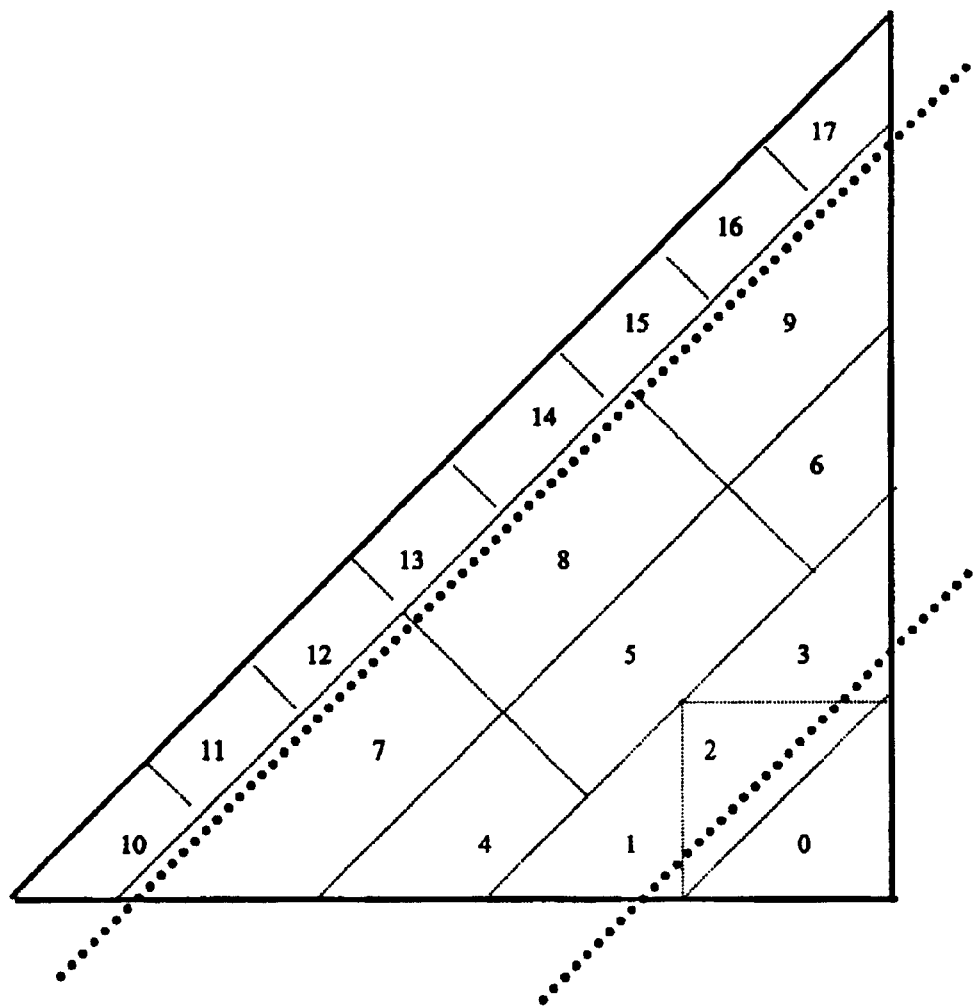
FIG. 15 is a view showing the MMD section of FIG. 14 classified into 18 levels by quantization.

FIG. 15 shows the color classes assigned at each bin when the Min_Max_Diff section is quantized in 18 levels on the basis of the classification of FIG. 14.

In FIG. 15, the bin 0 indicate the solid level, the bin 1~9 indicate the neutral level, and the rest of them indicate the gray level.

Figure 16:
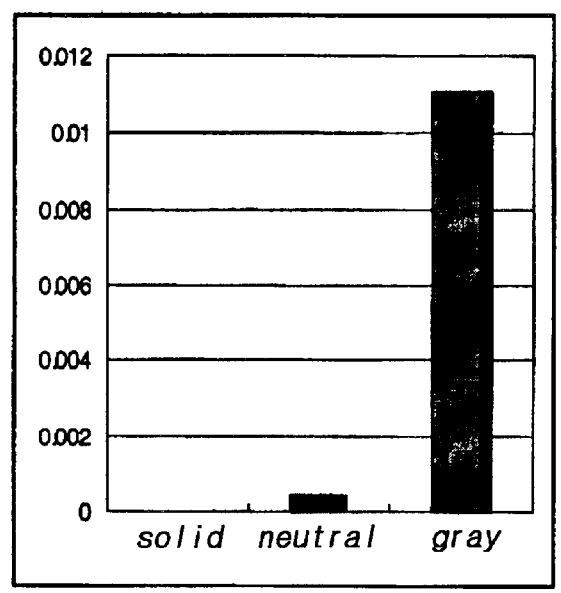
FIG. 16 is a histogram showing distribution of bin values of solid, neutral, and gray level color groups according to the present invention.
Figure 17:
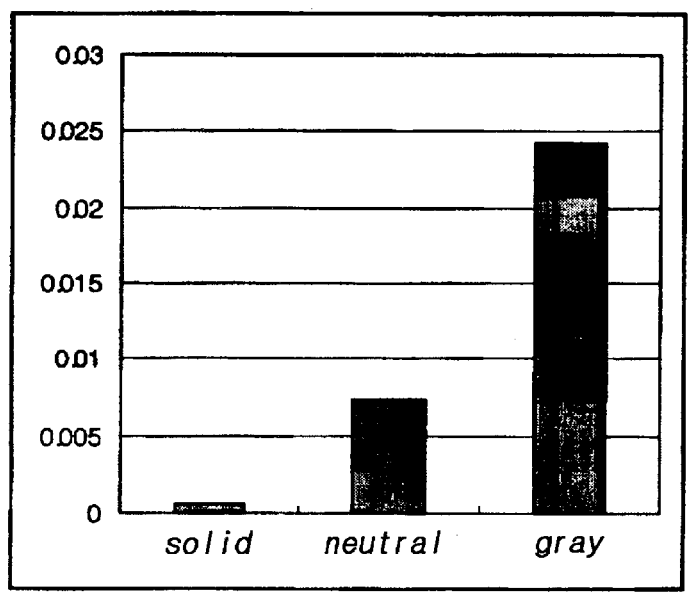
FIG. 17 is a histogram showing average of bin values of solid, neutral, and gray level color groups according to the present invention.

FIG. 16 is a graph for illustrating a distribution of the bin values of the three color groups and FIG. 17 shows the average of the bin values of the three color groups.

As shown in FIG. 16 and FIG. 17, the distribution and average of the solid color group because the solid colors little appears in images and a specific solid color appears only in a specific image. Accordingly, if the solid group colors are binarized in lower standard value relative to the other color groups, they can reflect the color features of an image.

Both the distribution and average of the gray level are large. This means that even though the difference between the bin values of histogram of each image is large, the result comes from the large value of itself such that the gray level does not influence in the image search.

Though, there can exist an image group capable of being retrieved using a few sparse gray color such that it is efficient to binarize the histogram with a low standard value for retrieving this image group.

Figure 18:
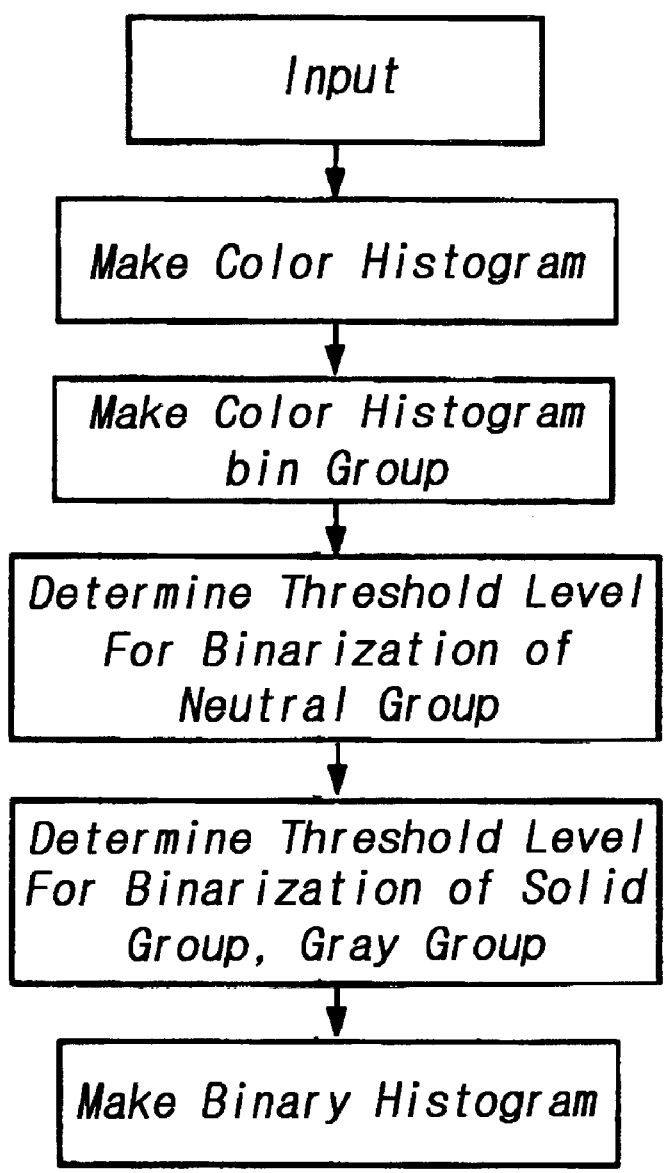
FIG. 18 is a flowchart for explaining an image feature extracting method according to the present invention.

FIG. 18 shows a procedure for extracting multimedia features according to the present invention.

As shown in FIG. 18, once image information is input, a color histogram is created and then the bins of the created color histogram are grouped into the solid, neutral, and gray levels.

Next, a neutral level binarization standard point is determined for binarizing the bins of the neutral level and then solid level and the gray level binarization standard points are determined below the neutral level binarization standard point.

Finally, each bin of the histogram is binarized on the basis of the binarization standard points so as to create binary color histogram, resulting in extracting multimedia features.

The multimedia feature information obtained in this method is stored as a multimedia feature of the corresponding multimedia object.

That is, the binary color histogram information adopting different standard point to each color group is added to the multimedia feature structure in addition to the conventional color histogram such that the binary color histogram information can be appropriately used in combination with the conventional color histogram in multimedia search.

What is claimed is:

1. A method of searching for a multimedia object using a color histogram, comprising the steps of:

computing a difference between a reference object color histogram and a target object color histogram;

binarizing the reference and target object color histograms;

obtaining information on color existence based on a comparison of the binarized color histograms if a bin value of one of the objects is 0 and a bin value of the other object is non-zero; and measuring similarity between the reference and the target objects using the difference between the reference and target color histograms and the information on the color existence.

2. A method at searching for a multimedia object using a color histogram, comprising the steps of:

computing a difference between a reference object color histogram and a target object color histogram;

deleting an anti-similarity caused by over-concentrated color elements for ignoring a difference derived from large values when bin values are greater than a predetermined threshold value; and measuring similarity between the reference and target color objects using the difference between the color histograms and information obtained by deleting the anti-similarity caused by the over concentrated color.

3. A method of searching for a multimedia object using a color histogram, comprising the steps of:

computing a difference between a reference object color histogram and a target object color histogram;

obtaining information on a color existence if a bin value of one of the objects is 0 and a bin value of the other object is non-zero;

deleting an anti-similarity caused by over-concentrated color elements for ignoring a difference derived from large values when bin values are greater than a predetermined threshold value; and measuring similarity between the reference and target color objects using the difference between the color histograms, the information on the color existence and deleting an anti-similarity caused by over concentrated color element.

4. The method as claimed in claim 1, wherein the similarity is measured through the following equation:

$$new\_dist = \beta \cdot exist + dist;$$

$\beta$: reflection rate, wherein the $\beta$ is proportional to the number of the bins (color quantization level);

exist: number or rate of bins of which value is 0 in one of the color histograms of the reference and target objects and is non-zero in other histogram;

dist: difference between the color histograms.

5. The method as claimed in claim 1, wherein the similarity (new_dist) is measured through the following equation:

$$new\_dist = \beta \cdot dist\_exist + dist;$$

β: reflection rate, wherein the β is proportional to the number of the bins (color quantization level);

dist_exist: number or rate of bins of which value satisfy an exclusive OR operation (XOR) of the color histograms of the reference and target objects;

dist: difference between the color histograms.

6. The method as claimed in claim 2, wherein the similarity (new_dist) is measured through the following equation for ignoring the difference caused from a large value that is greater than the predetermined threshold value;

$$New\_dist = dist\_dist\_H';$$

dist: difference between the color histograms;

dist_H': differences between high-filtered histograms of the reference and target objects.

7. The method as claimed in claim 2, wherein the step of deleting an anti-similarity caused by over-concentrated color elements is performed using a high-filtered histogram filtered through a high filter, wherein the high filter takes a difference between a bin value and a threshold value if each bin value is greater than the predetermined threshold value, and otherwise takes 0.

8. The method as claimed in claim 3, wherein the similarity (new_idst) is measured through the following equation:

$$new\_dist = \beta \cdot exist + dist - dist\_H';$$

β: reflection rate, wherein the β is proportional to the number of the bins (color quantization level);

exist: number or rate of bins of which value is 0 in one of the color histograms of the reference and target objects and is non-zero in other histogram;

dist: difference between the color histograms;

dist_H': differences between high-filtered histograms of the reference and target objects.

9. The method as claimed in claim 3, wherein the similarity (new_dist) is measured though the following equation:

$$new\_dist = \beta \cdot dist\_exist + dist - dist\_H';$$

β: reflection rate, wherein the β is proportional to the number of the bins (color quantization level);

dist_exist: number or rate of bins of which value satisfy an exclusive OR operation (XOR) of the color histograms of the reference and target objects;

dist: difference between the color histograms;

dist_H': differences between high-filtered histograms of the reference and target objects.

10. The method as claimed in claim 1, wherein the similarity (new_dist) is measured through the following equation for using the color existence information and ignoring the difference caused by the large values when bin values are greater than the predetermined threshold value:

new_dist=distance between transformed histograms of the reference and target objects;

when MAX is a maximum value that a bin can take in a transformed histogram, transforming each bin value of color histogram (a) into 0, if a transformed histogram bin value=0, (b) into a transformed histogram bin value=histogram×(MAX-T_O)×(MAX/T_U)+T_O, if the transformed histogram value is less than the threshold value (T_U), and (c) into a transformed histogram bin value=MAX, if the conditions of (a) and (b) are not satisfied (T_O is a reflection rate representing information of color existence and T_U is a threshold value).

11. The method as claimed in claim 10, wherein the value of T_O representing the reflection rate of the information of color existence is proportional to a number of bins of the histogram (color quantization level).

12. The method as claimed in claim 10, wherein the threshold value T_U is close to the maximum value (MAX) if the number of bins or color quantization level is over 128.

13. A method of searching for a multimedia object using a color histogram, comprising the steps of:

obtaining binary histograms of reference and target objects;

obtaining high-filtered histograms on a basis of a predetermined threshold value;

measuring similarity between the reference and the target objects using the binary histograms, the high-filtered histograms, and color histograms; and retrieving multimedia objects by arranging the multimedia objects in accordance with the similarity.

14. A method searching for a multimedia object using a color histogram, comprising the steps of:

when MAX is a maximum value that a bin can take in a transformed histogram, transforming each bin value of color histogram (a) into 0, if a transformed histogram bin value=0, (b) into a transformed histogram bin value=histogram×(MAX-T_O)×(MAX/T_U)+T_O, if the transformed histogram value is less than the threshold value (T_U), and (c) into a transformed histogram bin value=MAX, if the conditions of (a) and (b) are not satisfied (T_O is a reflection rate representing information of color existence, and T_U is a threshold value);

measuring similarity between reference and target objects using the transformed color histogram; and retrieving multimedia objects by arranging the multimedia objects in accordance with the similarity.

15. A method for extracting multimedia features from a multimedia object in a multimedia object search using a color histogram, comprising the steps of:

creating a color histogram of a multimedia object;

creating a binary histogram binarized on a 0 basis using the color histogram; and creating a high-filtered histogram on the basis of a predetermined threshold value using the color histogram.

16. A method for extracting a multimedia feature from a multimedia object in a multimedia object search using a color histogram, comprising the steps of:

creating a color histogram of a multimedia object; and when MAX is a maximum value that a bin can take in a transformed histogram, transforming each bin value of color histogram (a) into 0, if a transformed histogram bin value=0, (b) into a transformed histogram bin value=histogram bin value×(MAX-T_O)×(MAX/T_

U)+T_O, if the transformed histogram value is less than the threshold value (T_U), and (c) into a transformed histogram bin value=MAX, if the conditions of (a) and (b) are not satisfied (T_O is a reflection rate representing information of color existence, and T_U is a threshold value).

17. The method as claimed in claim 16, wherein the value of T_O representing the reflection rate of information of color existence is proportional to a number of bins of the histogram (color quantization level).

18. The method as claimed in claim 16, wherein the threshold value T_U is close to the maximum value (MAX) if the number of bins or color quantization level is over 128.

19. A computer-readable medium having stored thereon;
   (a) a color histogram of a multimedia object;
   (b) binary histogram binarized using the color histogram; and
   (c) a high-filtered histogram filtered on the basis of a predetermined threshold value using the color histogram.

20. A method of searching for a multimedia object using a binary color histogram as a multimedia object feature, comprising the steps of:
   classifying each bin of a color histogram into a predetermined number of groups based on color;
   defining, for each group, a standard point for binarizing the color histogram; and
   performing multimedia object retrieval by binarizing the color histogram on the basis of the binarization standard points.

21. The method as claimed in claim 20, wherein the bins are classified into (a) a solid group representing solid colors, (b) a gray group representing gray colors, and (c) a neutral group representing the rest color of the solid and gray colors.

22. The method as claimed in claim 21, wherein the solid color group represents a portion of the multimedia object where a white and black color rate is low, S and V are relatively large in a HSV color space, or a difference between Max(R,G,B) and Min(R,G,B) is relatively large in a HMMD color space.

23. The method as claimed in claim 21, wherein the gray group represents a portion of the multimedia object where a white and black colors rate is high, S and V are relatively small in a HSV color space, or a difference between Max(R,G,B) and Min(R,G,B) is relatively small in a HMMD color space.

24. The method as claimed in claim 21, wherein the binatization standard points of the solid and gray groups are determined based on a binarization standard point of the neutral group.

25. The method as claimed in claim 21, wherein the binarization standard points of the solid and gray groups are determined by a binarization standard point lower than the binarization standard point of the neutral group, based on the binarization standard point of the neutral group.

26. The method as claimed in claim 20, wherein the binarization standard values of the neutral group decrease, as the color quandzation level (number of bins in the color histogram) increase.

27. A method of extracting a multimedia feature from a multimedia object in a multimedia object search using a binary color histogram as a multimedia object feature comprising the steps of:
   (a) creating a color histogram;
   (b) classifying each bin value of the color histogram into a solid, gray, or neutral color group;
   (c) defining a binarization standard point for the neutral color group;
   (d) defining binarization standard points for the solid and gray color groups at lower points than the binarization standard point of the neutral color group; and
   (e) creating a binary color histogram by binarizing the bin values of the color histogram in accordance with the binarization standard values defined for each color group.

28. The method as claimed in claim 27, wherein the binarization standard point determines a standard point for binarizing the bins of the neutral color group from a sample group.

29. A computer-readable medium having stored thereon:
   (a) a color histogram;
   (b) a binary color histogram created by binarizing bin values of the color histogram in accordance with binatization standard values defined for respective predetermined color groups.

30. A method of searching for a multimedia object using a color histogram, comprising the steps of:
   computing a difference between a reference object color histogram and a target object color histogram;
   binarizing the reference and target object color histograms;
   obtaining information on color existence based on a comparison of the binarized color histograms if a bin value of one of the objects is a first value and a bin value of the other object is a second value different than the first value; and
   measuring similarity between the reference and the target objects using the difference between the reference and target color histograms and the information on the color existence.

* * * * *